United States Patent
Ahn et al.

(10) Patent No.: US 11,139,114 B2
(45) Date of Patent: Oct. 5, 2021

(54) MULTILAYER CAPACITOR

(71) Applicant: SAMSUNG ELECTRO-MECHANICS CO., LTD., Suwon-si (KR)

(72) Inventors: Jin Mo Ahn, Suwon-si (KR); Sang Roc Lee, Suwon-si (KR); Dong Hwi Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 180 days.

(21) Appl. No.: 16/525,732

(22) Filed: Jul. 30, 2019

(65) Prior Publication Data

US 2020/0090871 A1   Mar. 19, 2020

(30) Foreign Application Priority Data

Sep. 13, 2018  (KR) .................. 10-2018-0109455
Oct. 15, 2018  (KR) .................. 10-2018-0122625

(51) Int. Cl.
*H01G 4/30* (2006.01)
*H01G 4/228* (2006.01)
*H01G 4/012* (2006.01)
*H01G 4/12* (2006.01)

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC ........ H01G 4/012; H01G 4/12; H01G 4/1227; H01G 4/224; H01G 4/228; H01G 4/232; H01G 4/30; H01G 11/22; H01G 11/82
See application file for complete search history.

(56) References Cited

U.S. PATENT DOCUMENTS

| | | | | |
|---|---|---|---|---|
| 5,866,196 | A * | 2/1999 | Ueno | H01C 1/034 427/79 |
| 10,192,684 | B2 * | 1/2019 | Park | H05K 1/111 |
| 10,192,685 | B2 * | 1/2019 | Park | H01G 4/2325 |
| 2014/0145816 | A1 * | 5/2014 | Sato | H01F 17/0013 336/208 |
| 2018/0144864 | A1 * | 5/2018 | Park | H01G 4/224 |
| 2019/0037696 | A1 * | 1/2019 | Yamada | H05K 1/162 |
| 2019/0131076 | A1 * | 5/2019 | Fukumura | H01G 4/012 |

(Continued)

FOREIGN PATENT DOCUMENTS

| | | |
|---|---|---|
| JP | 8-162357 A | 6/1996 |
| JP | 2014-27085 A | 2/2014 |

(Continued)

*Primary Examiner* — Nathan Milakovich
(74) *Attorney, Agent, or Firm* — Morgan, Lewis & Bockius LLP

(57) ABSTRACT

A multilayer capacitor includes a body including a stack structure of a plurality of dielectric layers, and a plurality of internal electrodes stacked with the dielectric layers interposed therebetween. A stress alleviation portion is disposed on at least one surface among surfaces of the body, and an external electrode is disposed on an external portion of the body and connected to the internal electrodes. The stress alleviation portion includes a first resin layer adjacent to the body, and a second resin layer covering the first resin layer and including a filler dispersed in a resin of the second resin layer.

23 Claims, 10 Drawing Sheets

(56) References Cited

U.S. PATENT DOCUMENTS

| | | | |
|---|---|---|---|
| 2020/0152382 A1* | 5/2020 | Sakurai | H01G 4/232 |
| 2020/0161051 A1* | 5/2020 | Tanaka | H01G 4/005 |
| 2021/0065985 A1* | 3/2021 | Kim | H01G 4/30 |
| 2021/0065986 A1* | 3/2021 | Kim | H01G 4/008 |
| 2021/0074481 A1* | 3/2021 | Yi | H01G 4/30 |
| 2021/0082622 A1* | 3/2021 | Kim | H01G 4/012 |

FOREIGN PATENT DOCUMENTS

| | | |
|---|---|---|
| JP | 6044153 B2 | 12/2016 |
| KR | 10-2015-0047384 A | 5/2015 |

* cited by examiner

MULTILAYER CAPACITOR

CROSS-REFERENCE TO RELATED APPLICATION(S)

This application claims benefit of priority to Korean Patent Application No. 10-2018-0109455 filed on Sep. 13, 2018 and Korean Patent Application No. 10-2018-0122625 filed on Oct. 15, 2018 in the Korean Intellectual Property Office, the disclosures of which are incorporated herein by references in their entireties.

BACKGROUND

1. Field

The present disclosure relates to a multilayer capacitor.

2. Description of Related Art

A multilayer capacitor has been used in a variety of electronic products. As numerous functions requiring high reliability are implemented using electronic components and the consumption of such functions has increased, high reliability may also be required for a multilayer capacitor.

To improve reliability of a multilayer capacitor, structural stability may need to be secured, and to this end, it may be required to reduce defects in a ceramic body, an internal electrode, and the like, included in a multilayer capacitor.

Factors adversely affecting high reliability of multilayer capacitors include the permeation of a plating solution, cracks caused by external impacts, warpage occurring during mounting a capacitor on a substrate, and the like.

Generally, to address the issues outlined above, a resin compound including a conductive material may be sprayed into a region between an electrode layer and a plating layer of an external electrode to absorb external impacts and to prevent the permeation of a plating solution, thereby improving reliability.

SUMMARY

An aspect of the present disclosure is to provide a multilayer capacitor having improved warpage strength and moisture resistance reliability.

According to an aspect of the present disclosure, a multilayer capacitor is provided, the multilayer capacitor including a body including a stack structure of a plurality of dielectric layers, and a plurality of internal electrodes stacked with the dielectric layers interposed therebetween. A stress alleviation portion is disposed on at least one surface among surfaces of the body, and an external electrode is disposed on an external portion of the body and connected to the internal electrodes. The stress alleviation portion includes a first resin layer adjacent to the body, and a second resin layer covering the first resin layer and including filler dispersed in a resin of the second resin layer.

The stress alleviation portion may be disposed on at least one of two opposing surfaces of the body opposing each other in a layering direction of the plurality of dielectric layers.

The stress alleviation portion may be disposed on each of the two opposing surfaces.

The stress alleviation portion may be disposed on only one of the two opposing surfaces.

The stress alleviation portion may cover at least a portion of a side surface of the body connecting the two opposing surfaces and through which the internal electrodes are not exposed.

The external electrode may have a multilayer electrode structure, and may include a metal layer adjacent to the body and a conductive resin layer covering the metal layer.

The conductive resin layer may include metal particles dispersed in a resin of the conductive resin layer.

The metal layer may include nickel (Ni), copper (Cu), palladium (Pd), gold (Au), or alloys thereof.

The metal layer may be a sintered body formed of a conductive paste.

The first resin layer may extend to a region between the metal layer and the conductive resin layer.

The second resin layer may extend to a region between the metal layer and the conductive resin layer.

The first and second resin layers may both extend to a region between the metal layer and the conductive resin layer.

The conductive resin layer may cover the second resin layer.

The first resin layer may have a multilayer structure.

Among the multilayer structure of the first resin layer, a first layer disposed closer to the body may have an elasticity higher than an elasticity of a second layer disposed on the first layer.

Filler included in the second resin layer may be inorganic filler.

The inorganic filler may include $SiO_2$ or $Al_2O_3$.

The multilayer capacitor may further include a second external electrode spaced apart from the external electrode on the external portion of the body and connected to internal electrodes of the plurality of internal electrodes, and the stress alleviation portion may be disposed between the external electrode and the second external electrode on the at least one surface of the body and extends to contact each of the external electrode and the second external electrode.

According to another aspect of the present disclosure, a multilayer capacitor is provided, the multilayer capacitor including a body including a plurality of dielectric layers, and pluralities of first and second internal electrodes alternately stacked with the dielectric layers interposed therebetween. First and second external electrodes are spaced apart from each other on external portions of the body and connected to the first and second internal electrodes, respectively. A stress alleviation portion is disposed between the first and second external electrodes on at least one surface of the body. The stress alleviation portion includes a first resin layer adjacent to the body, and a second resin layer covering the first resin layer and including a filler dispersed in a resin of the second resin layer.

The stress alleviation portion may extend between the first and second external electrodes to contact each of the first and second external electrodes.

The stress alleviation portion may extend between at least a part of the first external electrode and the external portion of the body having the first external electrode disposed thereon, and between at least a part of the second external electrode and the external portion of the body having the second external electrode disposed thereon.

Each of the first and second external electrodes may include a metal layer adjacent to the body and a conductive resin layer covering the metal layer, and the stress alleviation portion may extend between the metal layer and the conductive resin layer of each of the first and second external electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
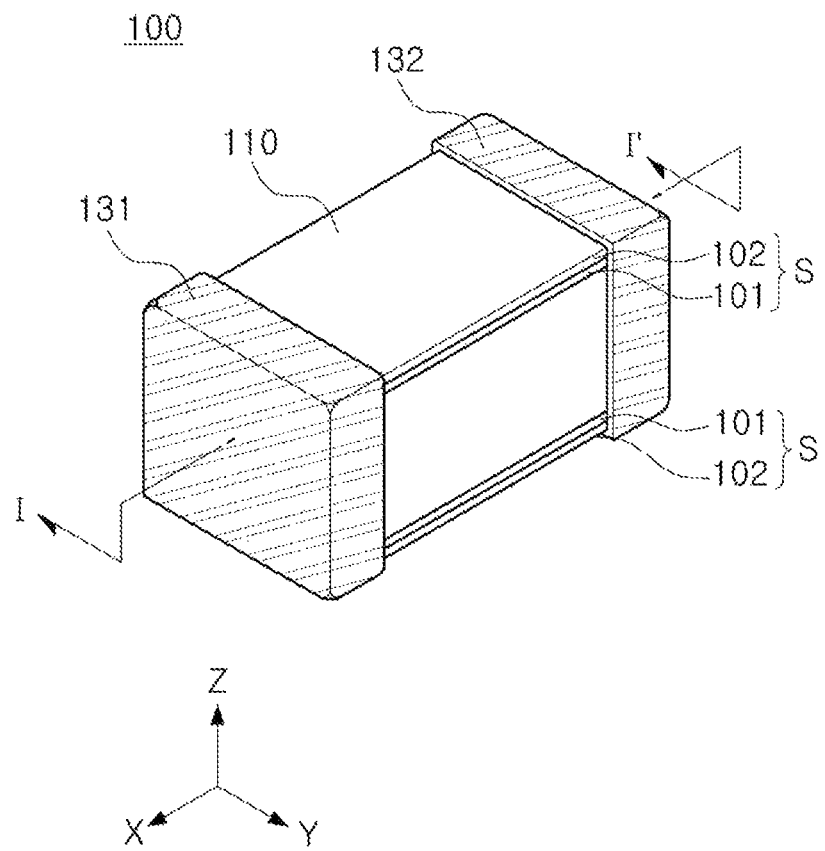
FIG. 1 is a perspective diagram illustrating an exterior of a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clarity of description. Also, elements having the same function within the scope of the same concept represented in the drawing of each exemplary embodiment will be described using the same reference numerals.

In the drawings, irrelevant descriptions will be omitted to clearly describe the present disclosure and, to clearly express a plurality of layers and areas, thicknesses may be magnified. Further, throughout the specification, it will be understood that when a part "includes" an element, it can further include another element, and will not generally exclude further elements unless otherwise indicated.

Figure 2:
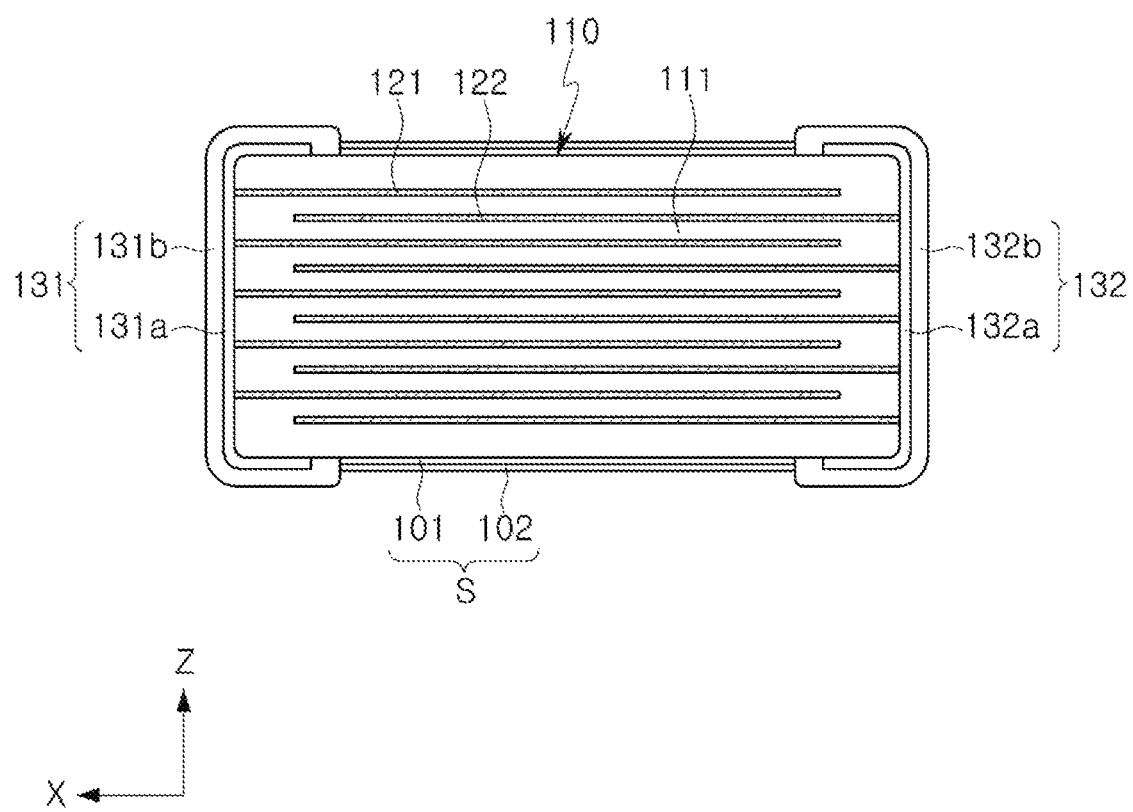
FIG. 2 is a cross-sectional diagram illustrating the multilayer capacitor illustrated in FIG. 1.
Figure 3:
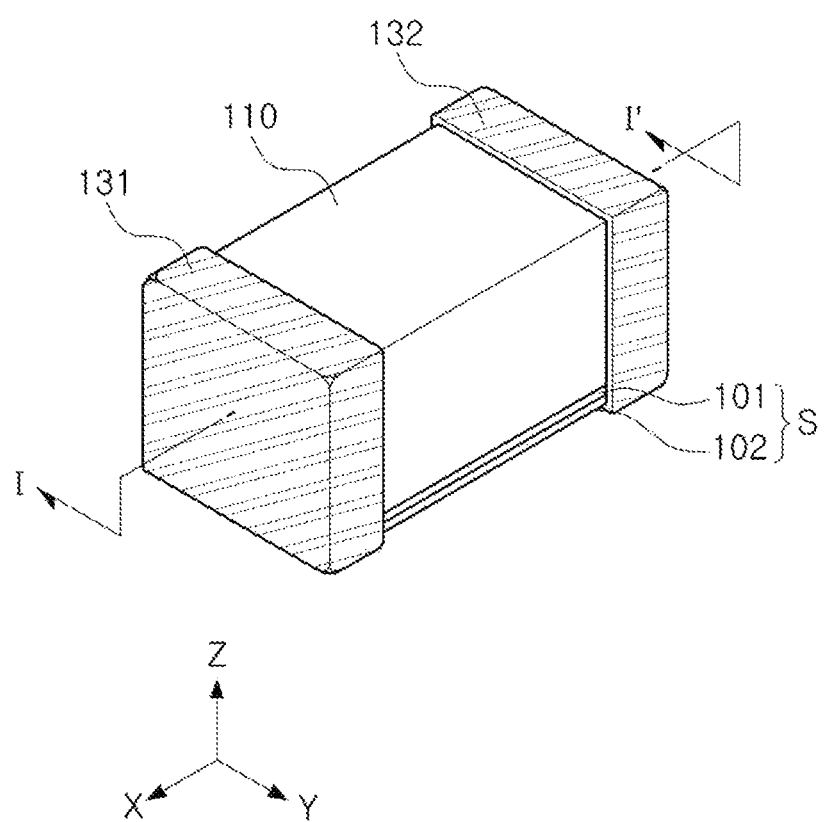
FIGS. 3 and 4 are perspective diagrams illustrating a modified example of a multilayer capacitor.
Figure 4:
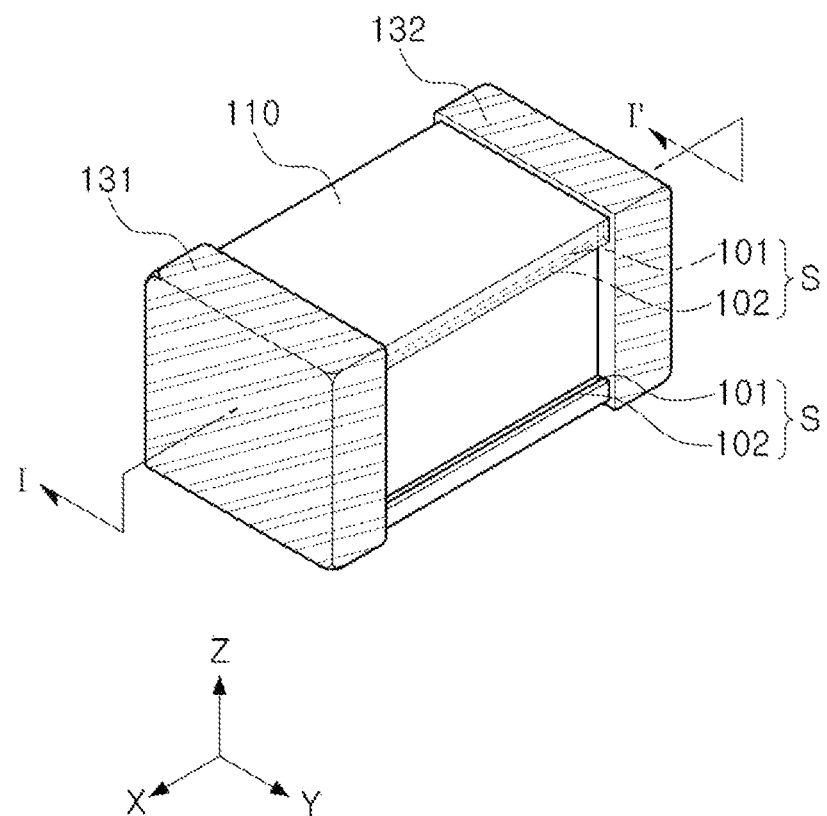
Figure 5:
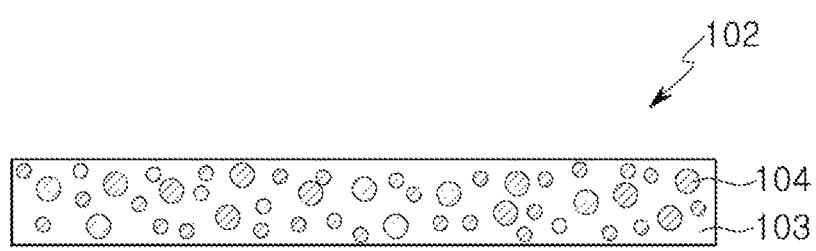
FIG. 5 is a cross-sectional diagram illustrating an example of a second resin layer employable in a multilayer capacitor.

FIG. 1 is a perspective diagram illustrating an exterior of a multilayer capacitor according to an example embodiment. FIG. 2 is a cross-sectional diagram illustrating the multilayer capacitor illustrated in FIG. 1. FIGS. 3 and 4 are perspective diagrams illustrating a modified example of a multilayer capacitor. FIG. 5 is a cross-sectional diagram illustrating an example of a second resin layer employable in a multilayer capacitor.

Referring to the diagrams, a multilayer capacitor 100 in the example embodiment may include a body 110, a stress alleviation portion S and external electrodes 131 and 132, and the stress alleviation portion S may include a first resin layer 101 and a second resin layer 102.

The body 110 may include a stack structure of a plurality of dielectric layers 111, and may be obtained by layering a plurality of green sheets and sintering the layered green sheets. By the sintering process, the plurality of dielectric layers 111 may have an integrated form. A shape and a size of the body 110 and the number of the dielectric layers 111 may not be limited to the examples illustrated in the diagrams. For example, as illustrated in FIG. 1, the body 110 may have a hexahedron form.

The dielectric layer 111 included in the body 110 may include a ceramic material having a high dielectric constant, and may include a BT based material, such as barium titanate ($BaTiO_3$) ceramic, for example, and another well-known material may also be used as along as sufficient capacitance may be obtained. If desired, the dielectric layer 111 may further include additives, organic solvents, plasticizer, coupling agents, dispersing agents, and the like, in addition to the ceramic material serving as a main element. The additives may include a metal element and may be added in a metal oxide form. As an example of the metal oxide additive, at least one of $MnO_2$, $Dy_2O_3$, BaO, MgO, $Al_2O_3$, $SiO_2$, $Cr_2O_3$, and $CaCO_3$ may be included.

A plurality of internal electrodes 121 and 122 forming capacitance may be disposed in the body 110. The internal electrodes 121 and 122 may be connected to different respective external electrodes 131 and 132 such that the internal electrodes 121 and 122 may have different polarities. The internal electrodes 121 and 122 may be obtained by printing paste including a conductive metal on one surface of a ceramic green sheet in a certain thickness and sintering the paste. In this case, the internal electrodes 121 and 122 stacked in a layering direction may be configured to be alternately exposed through opposing surfaces as illustrated in FIG. 2, and may be electrically isolated from each other by the dielectric layer 111 disposed therebetween. As a main material of the internal electrodes 121 and 122, nickel (Ni), copper (Cu), palladium (Pd), silver (Ag), and the like, or alloys thereof, may be used.

The external electrodes 131 and 132 may be disposed in an external portion of the body 110, and may be connected to the internal electrodes 121 and 122, respectively. As illustrated in the example in the diagrams, the external electrodes 131 and 132 may have a multilayer electrode structure. For example, the external electrodes 131 and 132 may include metal layers 131a and 132a adjacent to the body, respectively, and conductive resin layers 131b and 132b covering the metal layers, respectively. The metal layers 131a and 132a may be connected to (e.g., in contact with) the internal electrodes 121 and 122, respectively, and may include nickel (Ni), copper (Cu), palladium (Pd), gold (Au), or alloys thereof. In this case, the metal layers 131a and 132a may be a sintered body formed of a conductive paste obtained by spraying and sintering the conductive paste.

The conductive resin layers 131b and 132b may include a resin layer and metal particles, and the metal particles may be dispersed in the resin layer, for example. As illustrated in FIG. 2, the conductive resin layers 131b and 132b may cover overall areas of the metal layers 131a and 132a and may be in contact with the body 110 (e.g., the conductive resin layers 131b and 132b may be in direct contact with the body 110 at edges of the metal layers 131a and 132a).

Although the resin included in the conductive resin layers 131b and 132b may not have conductivity itself, the overall conductive resin layers 131b and 132b may have conductivity due to a point-contact effect or a tunneling effect of the metal particles dispersed in the resin layers. The metal particles included in the conductive resin layers 131b and 132b may include one or both of copper and silver. The resin included in the conductive resin layers 131b and 132b may include a thermosetting resin, such as an epoxy region, for example. The conductive resin layers 131b and 132b having the above-described structure may protect the multilayer capacitor 100 by absorbing external impacts.

Figure 6:
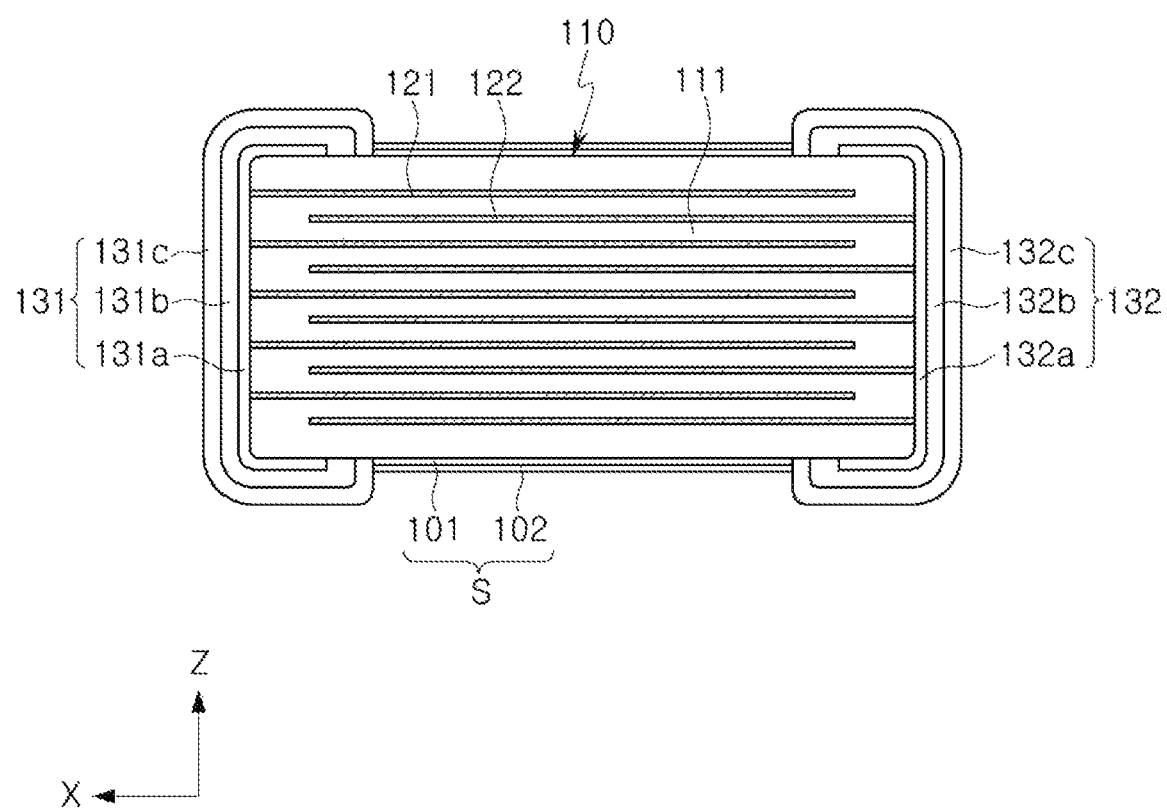
FIGS. 6 to 11 are cross-sectional diagrams illustrating modified examples of multilayer capacitors according to different example embodiments of the present disclosure.

Also, as illustrated in the modified example in FIG. 6, the external electrodes 131 and 132 may optionally further include metal layers 131c and 132c formed externally of the conductive resin layers 131b and 132b, and the metal particles included in the conductive resin layers 131b and 132b may work as a seed for forming the metal layers 131c and 132c. The metal layers 131c and 132c may be provided for improving mounting properties of the multilayer capacitor 100, may include a material such as Ni, Sn, Au, and the like, and may have a multilayer structure.

In the example embodiment, the stress alleviation portion S may be disposed on at least one surface among surfaces of the body 110, and in the example illustrated in the diagram, the stress alleviation portion S may be disposed on two surfaces among the surfaces of the body 110. The two surfaces may be two surfaces of the body 110 opposing each other in a layering direction (Z direction) of the plurality of dielectric layers 111, and one of the surfaces may be provided as amounting surface when the capacitor is mounted on a substrate.

The stress alleviation portion S may also be only disposed on only one surface (e.g., a lower surface in FIG. 3) of the two surfaces opposing each other as illustrated in FIG. 3, and in this case, the surface on which the stress alleviation portion S is disposed may be a mounting surface of the multilayer capacitor 100.

The stress alleviation portion S may also be disposed on one or more surface(s) other than the two surfaces opposing each other. For example, as illustrated in the example in FIG. 4, the stress alleviation portion S may also be disposed on a side surface of the body 110 connecting the two opposing surfaces, e.g. a side surface through which the internal electrodes 121 and 122 are not externally exposed.

As the area on which the stress alleviation portion S is disposed increases, the multilayer capacitor 100 may be effectively protected from external impacts such that moisture resistance reliability, and the like, may improve, and warpage properties may be resolved. FIG. 4 illustrates the example in which the stress alleviation portion S covers a portion of a side surface of the body 110, and the stress alleviation portion S may also cover an overall or entire side surface of the body 110.

As described above, the stress alleviation portion S may include the first resin layer 101 and the second resin layer 102. As the first resin layer 101 has elasticity, the first resin layer 101 may absorb stress, particularly absorb warpage stress occurring during mounting of the capacitor on a substrate. Thus, the first resin layer 101 may protect the multilayer capacitor 100 by significantly reducing warpage transmitted to the multilayer capacitor 100. The first resin layer 101 may be formed of a resin having elasticity, and may include an epoxy resin, for example, and may not substantially include filler.

As illustrated in FIG. 5, the second resin layer 102 may include filler 104 dispersed in a resin layer 103, and may be configured as a resin complex layer having relatively high stiffness. In this case, the filler 104 may be inorganic filler, and may include $SiO_2$, $Al_2O_3$, or the like, for example. The second resin layer 102 may be in a region primarily affected by warpage during mounting of the multilayer capacitor 100, and may effectively absorb tensile stress when warpage occurs. The warpage stress transmitted to an upper portion of the second resin layer 102 may be absorbed by the first resin layer 101 such that the multilayer capacitor 100 may be effectively protected.

As described above, in the example embodiment, by disposing the first resin layer 101 having high elasticity in a region adjacent to the body 110 and disposing the second resin layer 102 having high stiffness in a region primarily affected by external warpage stress, warpage stress may be significantly reduced. By including the stress alleviation portion S, the stress alleviation portion S may reduce the separation of the external electrodes 131 and 132 when the multilayer capacitor 100 is mounted on a substrate, and the like, and may also reduce acoustic noise by reducing vibrations caused by a piezoelectric phenomenon.

According to the experimentations conducted by the inventors, when the stress alleviation portion S having a multilayer structure was employed, the separation of the conductive resin layers 131b and 132b in the external electrodes 131 and 132 or cracks did not occur in the conductive resin layers 131b and 132b even when 10 mm of warpage occurred, differently from a general multilayer capacitor without the stress alleviation portion S in which a defect occurs by even 3 mm of warpage.

Also, as the stress alleviation portion S has a multilayer structure, the stress alleviation portion S may protect the external electrodes 131 and 132 and the body 110 from external impact, and may thus improve moisture resistance reliability of the multilayer capacitor 100. For example, the stress alleviation portion S may block moisture, metal ions, and the like, which may permeate the multilayer capacitor 100.

Modified example embodiments of the configurations described above will be described with reference to FIGS. 7 to 11. FIGS. 7 to 10 illustrate example structures in which a stress alleviation portion S is configured to extend into external electrodes 131 and 132 such that the alleviation of warpage stress and moisture resistance reliability may further improve, differently from the aforementioned example embodiment. FIG. 11 illustrates an example in which a first resin layer has a multilayer structure to more effectively absorb stress.

Figure 7:
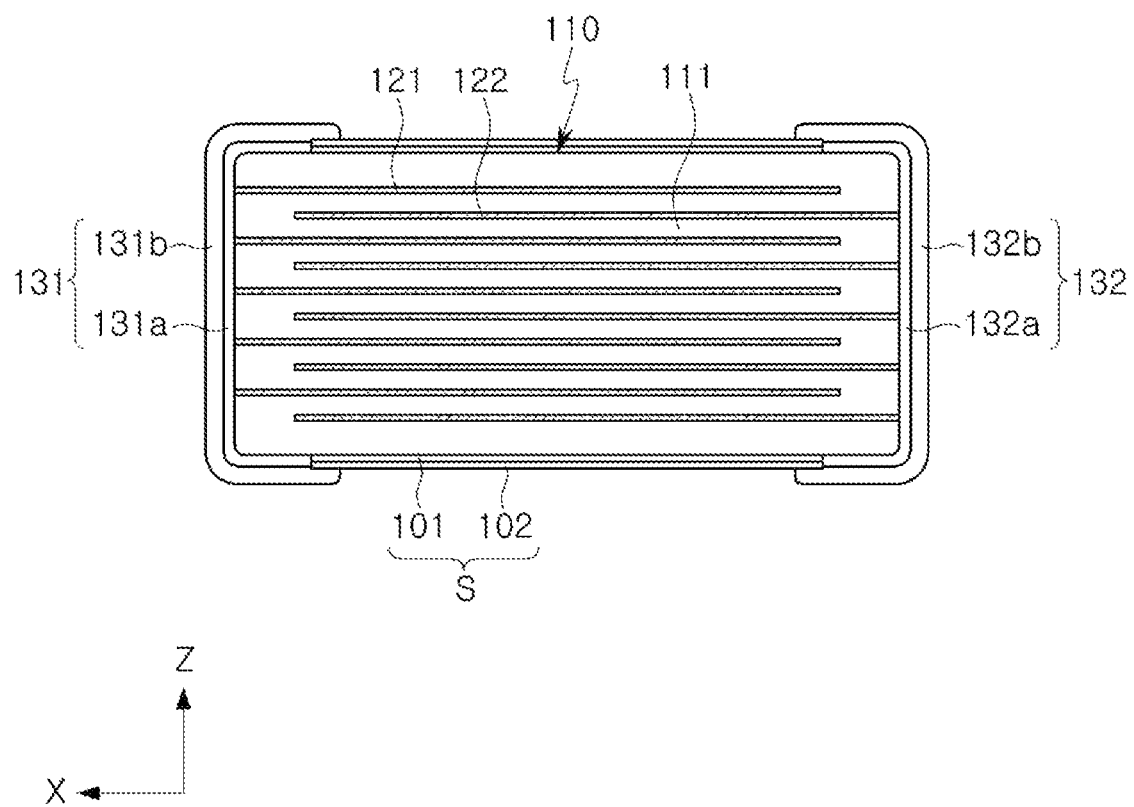

In the example illustrated in FIG. 7, first and second resin layers 101 and 102 may be configured to extend into conductive resin layers 131b and 132b (e.g., to extend between the body 110 and the conductive resin layers 131b and 132b), and the conductive resin layers 131b and 132b may cover the second resin layer 102. As an area in which the stress alleviation portion S is in contact with a body 110 and the conductive resin layers 131b and 132b may increase in the modified example as compared to the aforementioned example, the alleviation of warpage stress and moisture resistance reliability may further improve.

Figure 8:
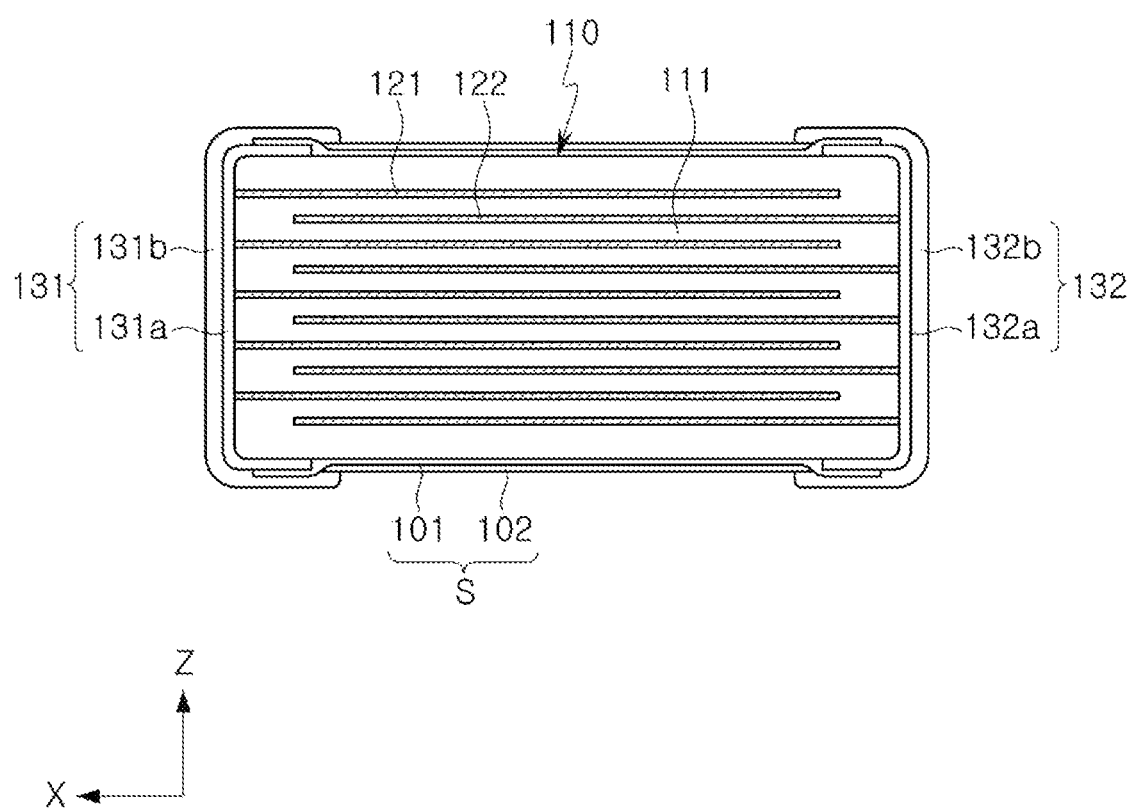

In the example illustrated in FIG. 8, a first resin layer 101 may be configured to extend to a region between metal layers 131a and 132a and conductive resin layers 131b and 132b. As an area occupied by the first resin layer 101 may increase and may extend into external electrodes 131 and 132, the alleviation of secondary warpage may further improve. In this case, the first resin layer 101 may extend to cover an overall upper surface or an overall lower surface of the body 110 to further improve the alleviation of warpage as illustrated in the example in the diagram, and may cover a region up to a curved corner region of the body 110.

Figure 9:
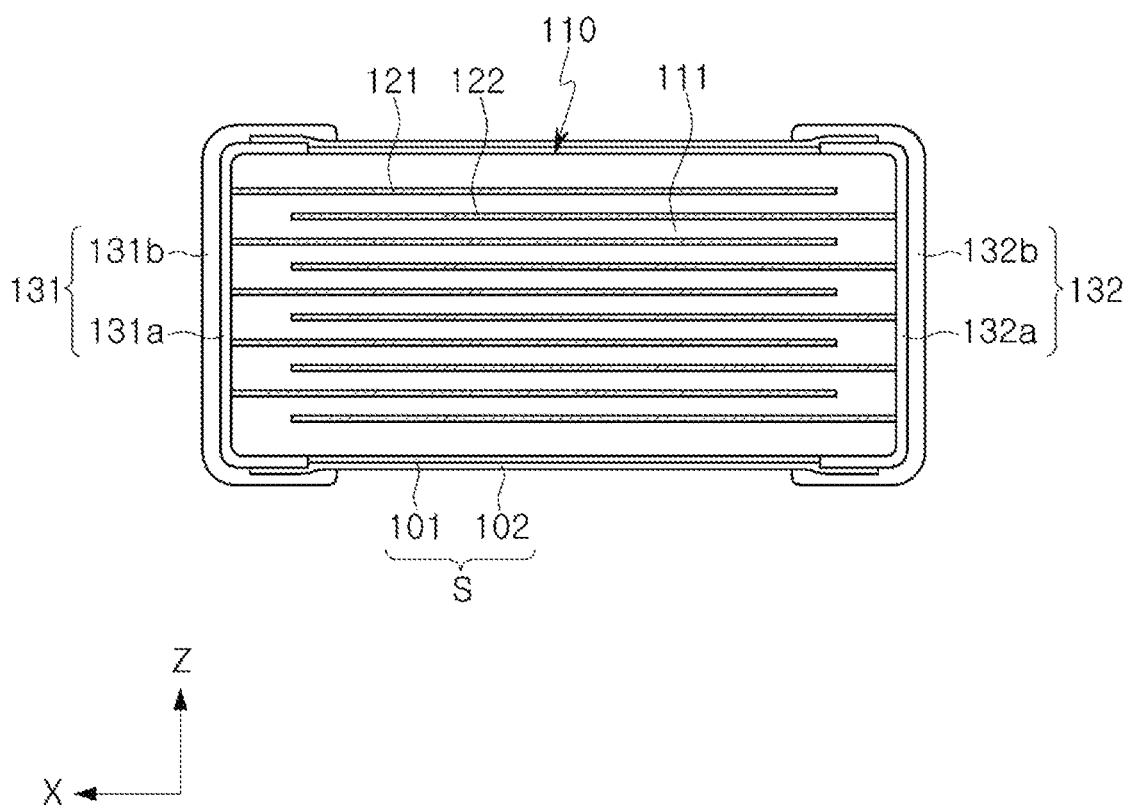

In the example embodiment illustrated in FIG. 9, a second resin layer 102 may extend into a region between metal layers 131a and 132a and conductive resin layers 131b and 132b. In the example embodiment, as the second resin layer 102 having high stiffness expands and extends into external electrodes 131 and 132, the alleviation of secondary warpage may improve. The second resin layer 102 may extend to cover an overall upper surface or an overall lower surface of the body 110 to further improve the warpage alleviation similarly to the first resin layer 101, and may cover a region up to a curved corner region of the body 110.

Figure 10:
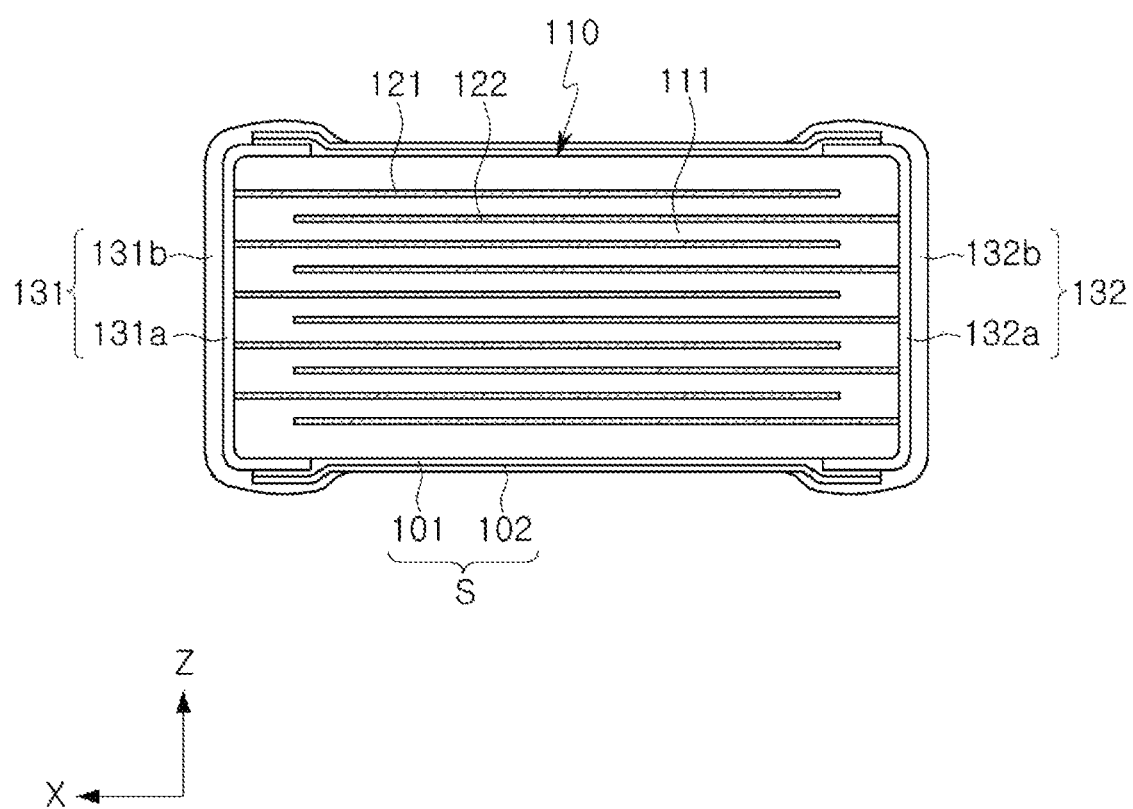
Figure 11:
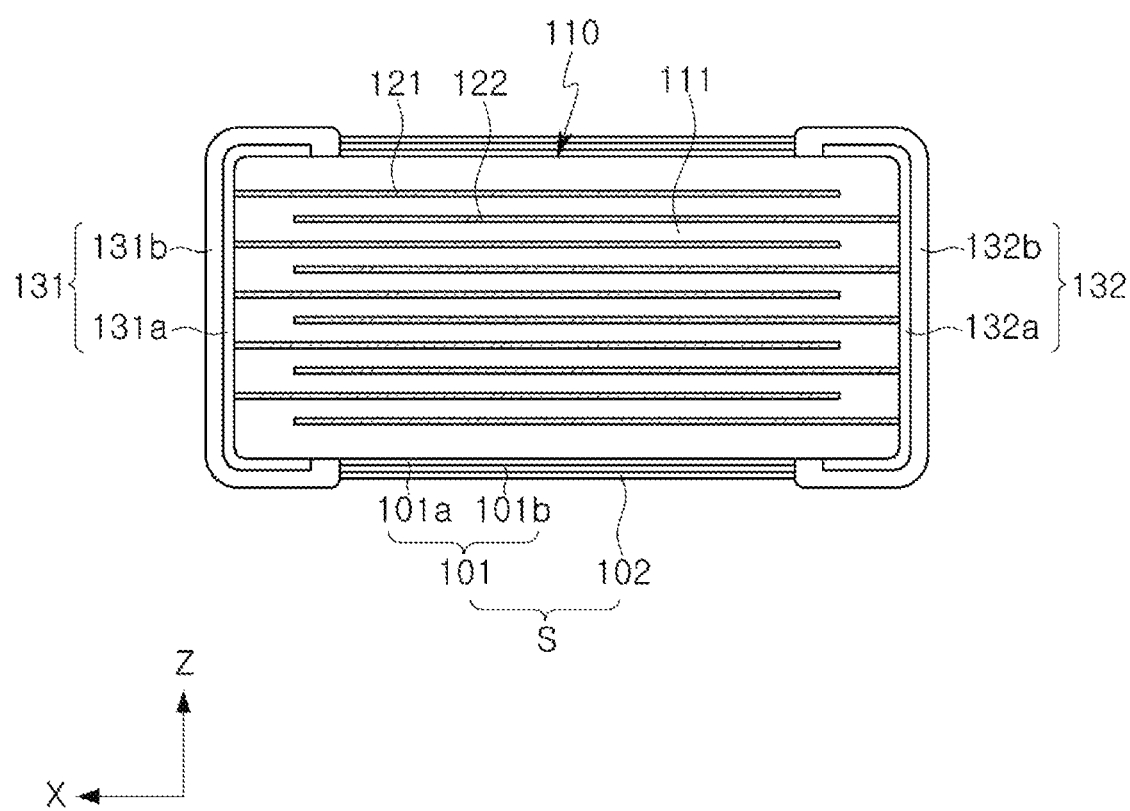

In the example embodiment illustrated in FIG. 10, both of first and second resin layers 101 and 102 may be configured to extend into a region between metal layers 131a and 132a and conductive resin layers 131b and 132b, and accordingly, warpage strength and moisture resistance reliability may significantly improve. In this case, as illustrated in the diagram, the first and second resin layers 101 and 102 may extend to cover an overall upper surface or an overall lower surface of the body 110 to further improve the warpage alleviation, and may cover a region up to a curved corner region of the body 110.

In the example embodiment illustrated in FIG. 11, a first resin layer 101 may have a multilayer structure, and may include two layers 101a and 101b, for example. Alternatively, the first resin layer 101 may have a multilayer structure including more layers than in the example. Among the first resin layers 101 of the multilayer structure, the layer 101a adjacent to the body 110 may have higher elasticity than the layer 101b spaced apart from the body 110. By configuring elasticity of the layer 101a adjacent to the body 110 to be relatively high, a stress alleviation portion S may more effectively absorb external stress using elastic transformation such that warpage of a multilayer capacitor may be alleviated. The example illustrated in FIG. 11 may be applied to the aforementioned modified examples as well in addition to the example embodiment illustrated in FIG. 1.

According to the aforementioned example embodiments, the multilayer capacitor may have improved warpage strength when the multilayer capacitor is mounted on a substrate, and may have improved reliability as moisture resistance reliability may improve.

While the exemplary embodiments have been shown and described above, it will be apparent to those skilled in the art that modifications and variations could be made without departing from the scope of the present invention as defined by the appended claims.

What is claimed is:

1. A multilayer capacitor, comprising:
a body including a stack structure of a plurality of dielectric layers, and a plurality of internal electrodes stacked with the dielectric layers interposed therebetween;
a stress alleviation portion disposed on at least one surface among surfaces of the body; and
an external electrode disposed on an external portion of the body and connected to the internal electrodes,
wherein the stress alleviation portion includes a first resin layer adjacent to the body, and a second resin layer covering the first resin layer and a mounting surface of the body, and
wherein the second resin layer includes a filler dispersed in a resin of the second resin layer.

2. The multilayer capacitor of claim 1, wherein the stress alleviation portion is disposed on at least one of two opposing surfaces of the body opposing each other in a layering direction of the plurality of dielectric layers.

3. The multilayer capacitor of claim 2, wherein the stress alleviation portion is disposed on each of the two opposing surfaces.

4. The multilayer capacitor of claim 2, wherein the stress alleviation portion is disposed on only one of the two opposing surfaces.

5. The multilayer capacitor of claim 2, wherein the stress alleviation portion covers at least a portion of a side surface of the body connecting the two opposing surfaces and through which the internal electrodes are not exposed.

6. The multilayer capacitor of claim 1, wherein the external electrode has a multilayer electrode structure, and includes a metal layer adjacent to the body and a conductive resin layer covering the metal layer.

7. The multilayer capacitor of claim 6, wherein the conductive resin layer includes metal particles dispersed in a resin of the conductive resin layer.

8. The multilayer capacitor of claim 6, wherein the metal layer includes nickel (Ni), copper (Cu), palladium (Pd), gold (Au), or alloys thereof.

9. The multilayer capacitor of claim 8, wherein the metal layer is a sintered body formed of a conductive paste.

10. The multilayer capacitor of claim 6, wherein the first resin layer extends to a region between the metal layer and the conductive resin layer.

11. The multilayer capacitor of claim 6, wherein the second resin layer extends to a region between the metal layer and the conductive resin layer.

12. The multilayer capacitor of claim 6, wherein the first and second resin layers both extend to a region between the metal layer and the conductive resin layer.

13. The multilayer capacitor of claim 6, wherein the conductive resin layer covers the second resin layer.

14. The multilayer capacitor of claim 1, wherein the first resin layer has a multilayer structure.

15. The multilayer capacitor of claim 14, wherein, among the multilayer structure of the first resin layer, a first layer disposed closer to the body has an elasticity higher than an elasticity of a second layer disposed on the first layer.

16. The multilayer capacitor of claim 1, wherein the filler included in the second resin layer is an inorganic filler.

17. The multilayer capacitor of claim 16, wherein the inorganic filler includes $SiO_2$ or $Al_2O_3$.

18. The multilayer capacitor of claim 1, wherein the multilayer capacitor includes a second external electrode spaced apart from the external electrode on the external portion of the body and connected to internal electrodes of the plurality of internal electrodes, and
the stress alleviation portion is disposed to fill a space between the external electrode and the second external electrode on the at least one surface of the body and to contact each of the external electrode and the second external electrode.

19. The multilayer capacitor of claim 1, wherein the stress alleviation portion is an insulator.

20. A multilayer capacitor, comprising:
a body including a plurality of dielectric layers, and pluralities of first and second internal electrodes alternately stacked with the dielectric layers interposed therebetween;
first and second external electrodes spaced apart from each other on external portions of the body and connected to the first and second internal electrodes, respectively; and
a stress alleviation portion disposed on at least one surface of the body,
wherein the stress alleviation portion includes a first resin layer adjacent to the body, and a second resin layer covering the first resin layer and including a filler dispersed in a resin of the second resin layer, and
wherein the first resin layer and the second resin layer are disposed between the first and second external electrodes on the at least one surface of the body.

21. The multilayer capacitor of claim 20, wherein the stress alleviation portion extends between the first and second external electrodes to contact each of the first and second external electrodes.

22. The multilayer capacitor of claim 21, wherein the stress alleviation portion extends between at least a part of the first external electrode and the external portion of the body having the first external electrode disposed thereon, and between at least a part of the second external electrode and the external portion of the body having the second external electrode disposed thereon.

23. The multilayer capacitor of claim 21, wherein each of the first and second external electrodes includes a metal layer adjacent to the body and a conductive resin layer covering the metal layer, and > the stress alleviation portion extends between the metal layer and the conductive resin layer of each of the first and second external electrodes.

* * * * *